United States Patent [19]

Boyd

[11] Patent Number: 5,023,310
[45] Date of Patent: Jun. 11, 1991

[54] PROPENYLPHENOXY-TERMINATED OLIGOMERIC TOUGHENERS AND THEIR USE IN BISMALEIMIDE RESIN COMPOSITIONS

[75] Inventor: Jack D. Boyd, San Clemente, Calif.

[73] Assignee: BASF Aktiengesellschaft, Ludwigshafen

[21] Appl. No.: 406,989

[22] Filed: Sep. 14, 1989

Related U.S. Application Data

[60] Division of Ser. No. 202,412, Jun. 6, 1988, Pat. No. 4,902,778, which is a continuation-in-part of Ser. No. 156,983, Feb. 18, 1988, Pat. No. 4,923,928.

[51] Int. Cl.$^5$ ............................................. C08G 59/14
[52] U.S. Cl. ....................................... 528/89; 528/97; 528/101

[58] Field of Search ............................. 528/89, 97, 101

[56] References Cited

U.S. PATENT DOCUMENTS 4,544,731 10/1985 Cavitt et al. ..................... 528/89

FOREIGN PATENT DOCUMENTS 0230741 8/1987 European Pat. Off. .

*Primary Examiner*—John C. Bleutge
*Assistant Examiner*—Robert E. L. Sellers, II
*Attorney, Agent, or Firm*—William G. Conger

[57] ABSTRACT

Chain extended tougheners derived from the reaction of a propenylphenol, a di- or polyphenol, and an epoxy resin may be used to increase the toughness of bismaleimide resin systems.

8 Claims, No Drawings ical properties of the cured resin. In addition to these
PROPENYLPHENOXY-TERMINATED OLIGOMERIC TOUGHENERS AND THEIR USE IN BISMALEIMIDE RESIN COMPOSITIONS This is a division of application Ser. No. 202,412 filed June 6, 1988, now U.S. Pat. No. 4,902,778, which is a continuation-in-part of application Ser. No. 156,983, now U.S. Pat. No. 4,923,928.

BACKGROUND OF THE INVENTION

1. Field of the Invention

The subject invention relates to propenylphenoxy-terminated oligomeric tougheners and to heat-curable resin compositions containing them. More particularly, the subject invention relates to bismaleimide resin systems which are cured in the presence of tougheners which are propenylphenoxy terminated, chain extended epoxy resins. The thermosetting resin systems find uses in structural adhesives and a matrix resins for prepregs and advanced structural composites.

2. Description of the Related Art

Both epoxy resins and bismaleimide resins have found increasing usefulness in high strength, high temperature applications in the structural materials field, for example, as candidates for structural adhesives and as matrix resins useful in heat-curable, fiber-reinforced prepregs. The bismaleimide resins, in particular, are noted for their high strength performance at elevated temperatures. Unfortunately, bismaleimide resins tend to be somewhat brittle, and thus subject to impact-induced damage. This susceptibility limits applications of the bismaleimides in the aerospace and transportation fields.

Epoxy resins generally cannot match the high temperature characteristics of the bismaleimide resins. Nevertheless, epoxy resins continue to be major adhesive and prepregging resins in the structural materials field because of the higher flexibility and impact resistance which occurs when epoxy systems are formulated appropriately.

It would be desirable to modify the more brittle bismaleimide resins with epoxy resins. Attempts to do so have, thus far, not proven successful for several reasons. For example, it is known that epoxy resins are incompatible with the bismaleimide monomers and precipitate upon standing, as evidenced by U.S. Pat. Nos. 4,131,632 and 4,212,959. This physical incompatibility of the uncured monomers may result in the preparation of resin films or prepregs which do not have the desired monomer contents due to the settling or filtering out of the monomer precipitate. It may also cause local non-homogeneity which may unexpectedly alter the physical properties of the cured resin. In addition to these problems of physical incompatibility, however, the epoxy and bismaleimide resins are chemically incompatible in the sense that they do not cross-cure.

In addition to the incompatibilities discussed above, the curing agents generally used with epoxy resins can create additional problems. Epoxy resins in high temperature, high strength applications are generally cured with amine-type curing agents, particularly 4,4'-diaminodiphenylsulfone and 4,4'-diaminodiphenylmethane. Unfortunately, these amine curing agents are also reactive with maleimides through a Michael-type reaction across the double bond. This reaction has been used in the past to prepare polyaminobismaleimides.

The reactivity of these amines with both epoxies and bismaleimides has the effect of altering the epoxy-amine stoichiometry. Moreover, it is difficult to overcome this effect because the magnitude of the various reactions is affected by the type of catalyst present, by the storage conditions of the uncured resin, and by the cure and postcure conditions.

It would be desirable to be able to formulate a resin system which can take advantage of the properties of both epoxy and bismaleimide resins without the above-mentioned problems. Such a resin system should provide a storage-stable, homogenous system which can cure in a predictable manner.

SUMMARY OF THE INVENTION

It has now been found that epoxy/maleimide resin systems may be prepared in which the epoxy and maleimide resins are compatible with each other and which cure to form a homogenous, substantially single phase system. These resin systems rely on the use of new chain-extended tougheners which are preferably prepared by the reaction of a propenylphenol with an epoxy resin and a di-or polyphenol. The cured resins show good toughness and high strength at elevated temperatures, thus successfully combining the properties of the separate monomers. Most surprisingly, the analogous allylphenol derived chain-extended tougheners fail to provide significant toughening, and further produce resins having undesirably long gel times.

The maleimides suitable for use in the subject invention are well known to those skilled in the art. These monomers are prepared by reacting maleic anhydride or substituted maleic anhydrides with an amine, preferably an aromatic diamine or mixtures of aromatic and aliphatic diamines to form bismaleimides. Tris- and tetrakismaleimides may also be useful in minor amounts, for example up to about 30 percent by weight based on the total weight of the maleimide component.

Preferred bismaleimides are eutectic mixtures of bismaleimides. Such mixtures comprise two or more bismaleimide monomers with the melting point of the mixture being lower than that of either monomer alone. Suitable monomers for such mixtures are bismaleimides derived from all aromatic diamines as well as those derived from aliphatic diamines. Also useful are the polyaminobismaleimides such as those prepared by reacting one or more bismaleimides with an aromatic or aliphatic diamine, and bismaleimides prepared from amine terminated polyarylene polymers containing alkyl, keto, sulfone, sulfide, and ether linkages interspersed between the aryl groups.

In addition to the bismaleimide resins useful with the modifiers of the subject invention, the heat curable resin systems may also contain numerous additional ingredients including fillers, dyes, pigments, rheology control agents and the like. The heat curable resin systems may also contain comonomers such as epoxy resins in relatively small amounts, cyanate resins, diamines, and particularly the o,o'-diallybisphenols. The resin systems may also contain thermoplastics such as the various polyarylene sulfides, sulfones, ketones, etherketones, and the like.

The prereact modifiers which are utilized in the resin formulations of the subject invention are conveniently and preferably prepared through the reaction of a propenylphenol with a difunctional epoxy resin and a di-or polyphenol or polyfunctional phenol. For example, one mole of a diphenol such as bisphenol A may be reacted with two moles of a difunctional epoxy such as the bis(glycidyl) ether of bisphenol A and two moles of 2-propenylphenol. A catalyst which promotes the reaction between phenolic hydroxy groups and the epoxy functionality is generally necessary. The reaction may be performed stepwise or concurrently, and the resulting products are expected to be substantially the same in either case.

DESCRIPTION OF THE PREFERRED EMBODIMENTS

The epoxy resins which may be used to form the chain-extended tougheners in the resin systems of the subject invention are well known to those skilled in the art. A variety of such resins are described in the treatise by Lee and Neville, *Handbook of Epoxy Resins*, McGraw-Hill, Inc., ©1967. Particularly preferred epoxy resins are the glycidyl derivatives of difunctional alcohols, phenols, amines and aminophenols.

Such epoxies, for example, include the so-called DGEBPA and DGEBPF resins which are the glycidyl ethers of bisphenols A and F respectively. The glycidyl ethers of other bisphenols and of mononuclear diphenols such as resorcinol, hydroquinone, and catechol may also be useful. Other difunctional resins include the glycidyl derivatives of monoamines such as aniline or toluidine.

However, a limited number of epoxy resins have been identified which produce composites having exceptional glass transition temperatures and impact resistance. Surprisingly, it has been found that there is no discernible relationship between the strength characteristics normally associated with the particular epoxies and systems containing the chain-extended coupling agents or modifiers of the subject invention and bismaleimide resins.

Preferred epoxy resins which have been found to produce cured products having exceptional strength and toughness are, for example, the polyglycidyl ethers of phenolated dicyclopentadiene and polydicyclopentadienes as disclosed in U.S. Pat. No. 3,536,734; and the diglycidylethers of dihydroxynaphthalenes, especially 1,6-bis(glycidoxy)-naphthalene, prepared by the process disclosed in U.S. Pat. No. 4,687,832.

The propenylphenols which are useful in preparing the prereact modifiers may be easily prepared from the corresponding allylethers by means of a Claisen rearrangement. When the ortho and para positions of the allylphenyl ether are available for the rearrangement, the ortho isomer is preferentially obtained. When both ortho positions are blocked, the para isomer is obtained. The allylphenols, generally o-allylphenols obtained as described above are then isomerized to propenylphenols in the presence of base, as described in *J. Am. Chem. Soc.*, 78, pp 1709-13 (1956).

Preferred propenylphenols are 2-propenylphenol and 4-propenylphenol and dipropenylphenols such as 2,4- and 2,6-dipropenylphenol. The corresponding propenylnaphthols and other moieties containing both a single hydroxyl functionality and one or more propenyl groups may also be used. The term "propenylphenol" as used here and in the claims, refers to substituted and unsubstituted compounds having one or more propenyl or substituted propenyl groups attached to one or more aryl groups, the molecule as a whole having but one phenolic hydroxy group. Thus the definition does not incorporate compounds such as propenyldiphenols, i.e. propenylresorcinol, or dipropenylbisphenols, i.e. o,o'-dipropenylbisphenol A.

When the propenylphenol and di- or polyphenol are reacted with the epoxy resin, a catalyst of the type which is effective in promoting the reaction between the epoxy group and phenolic hydroxyl groups is required. Examples of such catalysts are the tris-substituted phosphines and phosphonium salts, phosphoranylidene succinic acid derivatives such as those described in U.S. Pat. No. 4,320,222 and N-[3-phosphoranylidenyl-1-azacyclopentane-2,4-dione]-radical containing compounds. Additional examples of catalysts may be found in *Epoxy Resins, Chemistry and Technology*, Clayton May et. al., Ed., Marcel Dekker ©1973, at pages 268-270. Preferred catalysts are triorganophosphines such as triphenylphosphine, tetraorganophosphonium salts such as ethyltriphenylphosphonium iodide, and N-[3-triaryl- and N-[3-trialkylphosphoranylidenyl]-1-azacyclopentane-2,4-dione-radical-containing catalysts. These latter catalysts are conveniently prepared by reacting a tris-substituted phosphine with a maleimide-group-containing compound in an inert solvent at temperatures of from about 0° to 25° C. The amount of catalyst used is from about 0.01 weight percent to about 10 weight percent based on the weight of propenylphenol plus epoxy, more preferably from about 0.1 wt. percent to about 1.0 wt. percent. An inhibitor such as butylated hydroxytoluene or butylated hydroxyanisole may be added to prevent unwanted side reactions, particularly premature polymerization of the ethylenic bonds.

Thus the idealized product of the reaction is an oligomeric, chain-extended toughener having the following structure:

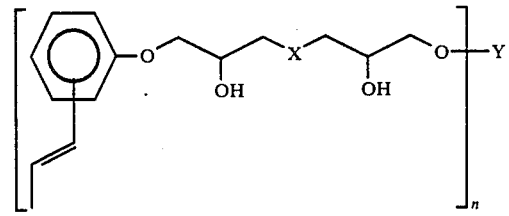

wherein X is an organic residue derived from the difunctional epoxy used, Y is the residue derived from the di- or polyphenol, and n is an integer from 2 to about 4 or more.

In order to modify the reactivities, viscosities, or other physical and/or chemical properties, it may be desirable to cap the free aliphatic hydroxyl groups with a $C_1-C_{10}$ lower alkyl, halogenated alkyl, aryl, aralkyl, or organosilyl group, particularly a trimethylsilyl group, to form the corresponding —O—R ether. Such capping methods are well known to those skilled in the art, for example, the method disclosed in U.S. Pat. No. 4,587,365. The product of such capping operations would then have an idealized structure corresponding to:

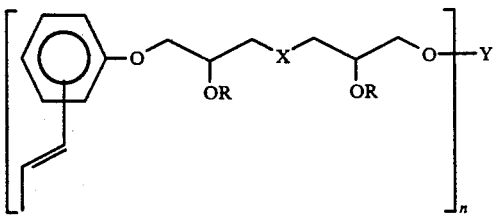

wherein R is hydrogen or one of the capping groups identified above.

Of course, both the capped and non-capped "idealized" structures are just that. The actual product will contain a substantial amount of compounds containing such idealized structure, but will also be expected contain variable quantities of lower oligomers and higher oligomers which result from further chain extension by reaction between the di- or polyphenol and the diepoxide. Thus when the di- or polyphenol is a diphenol, the chain-extended tougheners correspond to the formula:

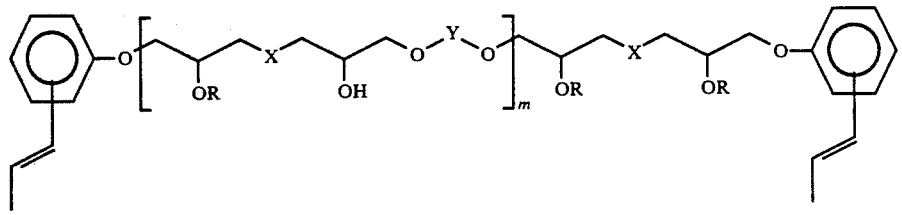

wherein m is, on the average, greater than one. Suitable tougheners may also be formed from mixtures of diphenols and/or polyphenols, particularly when prepared in stepwise fashion.

The reaction generally takes place at elevated temperatures, for example from 80° C. to about 200° C., preferably from about 100° C. to about 200° C., and most preferably between 130° C. and 170° C. The reaction temperature may be adjusted within these ranges to take into account the chemical reactivities of the various ingredients and the nature and amount of catalyst.

The length of the reaction can vary from a few minutes to several days depending upon the ingredients, the temperature and the catalyst. The end point of the reaction may be determined by observing the change in the epoxy equivalent weight. The reaction is complete in the case where excess or stoichiometrically equivalent amounts of phenolic hydroxy groups are present when the number of epoxy equivalents as measured by titration reaches zero, corresponding to an infinite epoxy equivalent weight. In the case where lesser amounts of phenolic hydroxy groups are present, the reaction is complete when the epoxy equivalent weight reaches a maximum.

The ratio of phenolic hydroxyl groups in the propenylphenol to phenolic hydroxyls of the di- or polyphenol to epoxy groups in the epoxy resin should be preferably within the range of 0.7–1.3:0.7–1.3:2, more preferably 0.9–1.1:0.9–1.1:2. For most applications, this range should be about 1:1:2. In general, the sum of the moles of all phenolic hydroxyl groups should be about equal to the total moles of epoxy groups.

The chain extended modifiers of the subject invention may range from a viscous resin to a brittle solid. If liquid, the prereact may be used as such to modify the bis-or polymaleimide resin. If solid, the prereact is generally finely ground and added to the maleimide resin to facilitate dissolution to a homogenous product with minimal exposure to heat, or slurried into the liquid monomers in the form of particles having a size of less than 20 μm, preferably less than 10 μm, and most preferably less than 5 μm.

The amount of chain extended modifier required in a particular bismaleimide resin system will vary depending upon the other system components and the degree of toughening required. As the subject invention tougheners do not depress the $T_{\Delta G'}$ by excessive amounts, up to 80 percent or thereabout by weight of toughener may be used. Generally, however, from 5 to about 60 percent by weight and preferably from 30 to about 50 percent by weight is used. By the term "toughening amount" is mean that quantity of toughener needed to toughen the particular resin system by an amount which is statistically significant. The amount of toughening may be measured by comparing impact-induced damage, by measuring compression after impact (CAI) values, or by other means commonly used by those skilled in the art.

The invention will now be illustrated by reference to the following examples. These examples should not be construed as limiting the scope of the subject matter of the invention in any manner.

Example 1

One equivalent of an epoxy resin which is a glycidyl ether of phenolated dicyclopentadiene as taught by U.S. Pat. No. 3,536,734 (hereinafter GPDCPD epoxy) was reacted with 0.5 equivalent of 2,7-dihydroxynaphthalene at 320° F. (160° C.) for four hours in the presence of 0.1 weight percent triphenylphosphine. Then, 0.5 equivalent of 2-propenylphenol was added and the reaction continued for four additional hours. The product was a solid.

Example 2 (Comparative)

A non-chain-extended toughener was prepared in a manner similar to that of Example 1 but omitting the 2,7-dihydroxynaphthalene. A 1:1 equivalent ratio of phenolic hydroxy groups to epoxy groups was used, and the total reaction time increased to 16 hours.

Example 3 (Comparative)

A toughener analogous to that of Example 7 of European patent EP-A-0230741 was prepared in a manner similar to that of Example 1, but using 2-allylphenol instead of 2-propenylphenol. The diphenol and epoxy were 2,7-dihydroxynaphthalene and GPDCPD epoxy, respectively. The ingredients were reacted simultaneously in the presence of 0.2 weight percent of triphenylphosphine and 0.1 percent butylatedhydroxytoluene, at 320° F. (160° C.) for four hours.

Example 4

A heat-curable bismaleimide resin system was prepared by melting the required quantity of Compimide® C-353, a eutectic blend of bismaleimides, at 250° F. (121° C.) and adding the molten toughener of Example 1 at 150° F. to 250° F. (66°-121° C.). When a uniform solution was obtained, triphenylphosphine catalyst was added at about 160° F. (71° C.) and the product doctored onto silicone coated release paper. Three different resins were prepared, containing 34 weight percent, 40 weight percent, and 45 weight percent of toughener, respectively.

Examples 5 and 6 (Comparative)

In a manner similar to that of example 3, heat-curable bismaleimide resin systems were prepared containing the comparative tougheners from Examples 2 and 3, respectively.

Prepregs were prepared from the matrix resins prepared in Examples 4-6 by impregnating Thornel T-300 3 K 70PW woven carbon fiber fabric to a 33± 3 weight percent resin content. These prepregs were then used to form 12 and 16 ply quasiisotropic panels. The panels were cured in an autoclave for 6 hours at 350° F. (177° C.) followed by a post cure of 3 hours at 450° F. (232° C.).

Specimens measuring 12.5 mm by 76.5 mm were cut from the 12 ply panels and subjected to DMA testing. A Dupont 982 instrument was used at a heating rate of 10° C./minute. The $T_{AG'}$ was taken as the midpoint in the first transition of the frequency versus temperature curve.

The 16 ply panels were subjected to impact testing by measuring the impact induced damage which resulted from a 230 in-lb/in (147 KJ/m) impact. The damage area was measured by ultrasonic C-scan. The results of the various tests are summarized in Table I below.

I claim:

1. A chain-extended toughener, comprising: the reaction product of a propenylphenol, a diphenol or polyphenol, and an epoxy resin, wherein the mole ratio of phenolic hydroxyls in said 2-propenylphenol to hydroxyl groups in said diphenol or polyphenol to epoxy groups in said epoxy resin is from about 0.7-1.3:0-.7-1.3:2 said toughener having the formula:

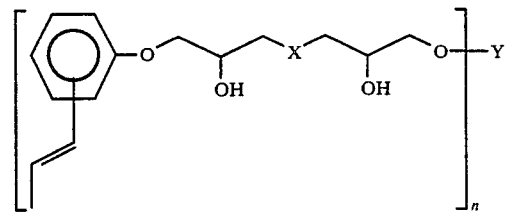

wherein X is the residue of the epoxy resin, Y is the residue of a diphenol or polyphenol, and n is an integer of 2 or more.

2. The composition of claim 1 wherein said ratio is from about 0.9-1.1:0.9-1.1:2.

3. The composition of claim 1 wherein said diphenol or polyphenol is selected from the group consisting of the dihydroxynaphthalenes, the phenolated dicyclopentadiene oligomers, and mixtures thereof.

4. The composition of claim 2 wherein said diphenol or polyphenol is selected from the group consisting of the dihydroxynaphthalenes, the phenolated dicyclopentadiene oligomers, and mixtures thereof.

5. The composition of claim 1 wherein said epoxy resin is selected from the group consisting of the glycidyl ethers of the bisphenols, the gylcidyl ethers of the dihydroxynaphthalenes, and the phenolated dicyclopentadiene oligomers.

6. The composition of claim 2 wherein said epoxy resin is selected from the group consisting of the glyci-

TABLE I

| Matrix Resin From Example | Alkenylphenol | Diphenol | % Toughener | Damage[1] Area | Dry $T_{AG'}$[2] | Gel Time[3] |
|---|---|---|---|---|---|---|
| 4 | 2-propenylphenol | 2,7-dihydroxynaphthalene | 34 | 29.0 | 306 | — |
| 4 | 2-propenylphenol | 2,7-dihydroxynaphthalene | 40 | 17.4 | 298 | — |
| 4 | 2-propenylphenol | 2,7-dihydroxynaphthalene | 45 | 11.6 | 294 | 21 |
| 6 comparative | 2-allylphenol | 2,7-dihydroxynaphthalene | 45 | 33.5 | — | 48 |
| 5 comparative | 2-propenylphenol | none | 35 | 14.2 | 305 | — |
| 5 comparative | 2-propenylphenol | none | 40 | 12.9 | 301 | — |
| 5 comparative | 2-propenylphenol | none | 45 | 13.5 | 295 | — |

[1] Damage area in cm$^2$, sum of seventeen trials.
[2] $T_{AG'}$ in °C.
[3] Gel time in minutes at 350° F. (177° C.)

Table I indicates that the tougheners of the subject invention have dramatically better toughening ability over those employing 2-allylphenol as disclosed in EP-A-0 230 741, a much shorter (<50%) gel time as well. Table I also shows that while the subject invention tougheners are not as good as their non-chain-extended analogues when used in low concentrations, at higher concentrations (i.e. 45% by weight), resin systems containing the subject invention tougheners have superior toughness. As a matter of fact, the toughening ability of the non-chain-extended tougheners appears to have maximized at some concentration less than 45 weight percent.

dyl ethers of the bisphenols, the gylcidyl ethers of the dihydroxynaphthalenes, and the phenolated dicyclopentadiene oligomers.

7. The composition of claim 1 wherein said diphenol or polyphenol is selected from the group consisting of the dihydroxynaphthalenes, the phenolated dicyclopentadienes, and mixtures thereof, and wherein said epoxy resin is selected from the group consisting of the glycidyl ethers of the dihydroxynaphthalenes, the phenolated dicyclopentadienes and mixtures thereof.

8. The composition of claim 1 wherein said reaction product is prepared in the presence of an effective amount of a triorganophosphine or tetraorganophosphonium salt catalyst.